F. NIELSEN.
AIR COMPRESSOR.
APPLICATION FILED FEB. 23, 1912.
1,127,079.
Patented Feb. 2, 1915.
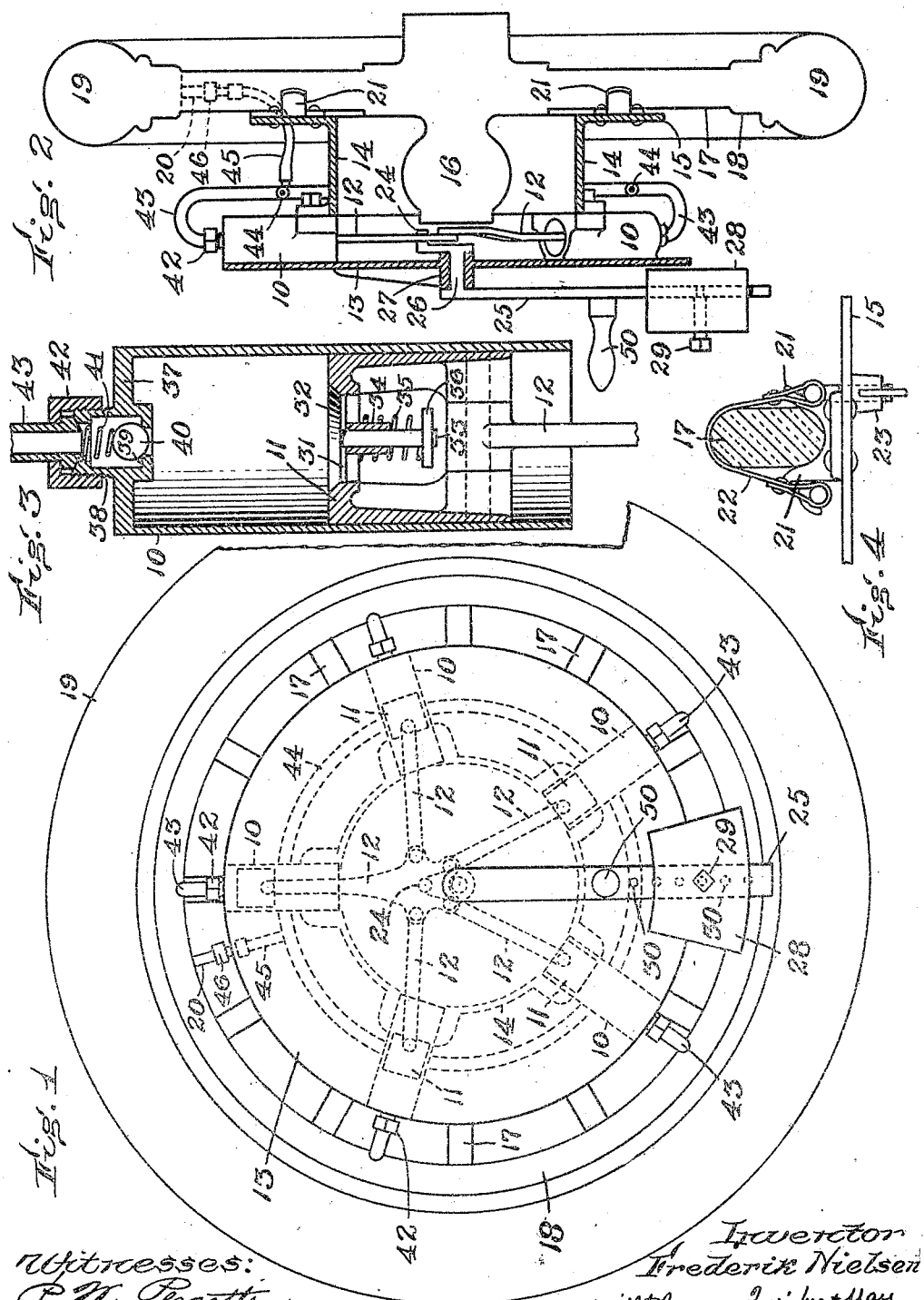

UNITED STATES PATENT OFFICE.

FREDERIK NIELSEN, OF BOSTON, MASSACHUSETTS.

AIR-COMPRESSOR.

1,127,079.

Specification of Letters Patent.

Patented Feb. 2, 1915.

Application filed February 23, 1912. Serial No. 679,241.

*To all whom it may concern:*

Be it known that I, FREDERIK NIELSEN, a subject of the King of Denmark, and resident of Boston, in the county of Suffolk and State of Massachusetts, have invented certain new and useful Improvements in Air-Compressors, of which the following is a specification.

The object of the present invention is to provide an air compressor for inflating a pneumatic tire while the same is in use upon a moving vehicle. Incidentally the compressor is capable of inflating a tire while the same is stationary, and is capable of quick and easy attachment and detachment. It is also capable of adjustment for varying the maximum degree of pneumatic pressure which it develops.

Of the accompanying drawings, which illustrate the invention: Figure 1 represents a side elevation of an air compressor attached to a wheel in operative relation thereto. Fig. 2 represents a vertical section through the center of the same. Fig. 3 represents a longitudinal section through one of the air compressing cylinders. Fig. 4 represents a device for securing the compressor to a spoke of a wheel.

The same reference characters indicate the same parts wherever they occur.

The drawings are somewhat conventional in the matter of structure, with the intention of avoiding unnecessary views and of facilitating an understanding.

The invention comprises air-compressing means preferably consisting of a plurality of cylinders and pistons. In the present embodiment of the invention there are five such cylinders, each of which is indicated at 10. The cylinders are disposed about a common center, and their axes are arranged radially with relation thereto. Each cylinder has a piston 11, and each piston has a connecting rod 12. The connecting rods are all connected together and are actuated by a common actuator, as hereinafter explained.

The illustrated structure, although capable of many modifications, is as follows:

The cylinders are all cast integrally with a main plate 13, and to them is secured by suitable means, such as bolts, a cylindric member 14 which is adapted to encircle the hub of the wheel to which the compressor is attached. This member 14 has a flat flange 15 to which are affixed suitable devices for engaging the spokes of the wheel to hold the compressor in the desired relation to the wheel. The elements 13, 14 and 15 constitute the frame of the compressor.

The hub of a wheel is indicated at 16, the spokes thereof at 17, the rim at 18, the pneumatic tire at 19, and the valve stem of the tire at 20.

The devices shown by Figs. 2 and 4 for securing the compressor to the wheel comprise fingers 21 which are adapted to straddle the spokes 17, and binding devices consisting of flexible metal bands 22 and tightening nuts 23 therefor. Two of such devices, disposed 180 degrees apart, are sufficient for the present style artillery wheels, which usually have either ten or twelve spokes,—ten being the usual number in front wheels and twelve in rear wheels. Additional fingers 21 are provided, however, to engage other spokes to keep the common center of the cylinders coincident with the axis of the wheel.

One of the connecting rods 12, the upper one as shown by the drawings, directly engages a crank 24, which for convenience of illustration is of the same piece as an arm 25. The crank shaft 26 which connects the arm with the crank is mounted in a bearing 27 afforded by the plate 13. The arm 25 is weighted so that it will normally tend to occupy the position shown. An adjustable weight is indicated at 28, and is secured to the arm by a bolt 29. The arm has a series of holes 30 each of which may receive the inner end of the bolt. The arm 25 is also provided with a handle 50 by which it may be manually turned. The other connecting rods 12 are pivotally connected to the one already described, so that they will all be operated thereby.

The cylinder and piston construction shown by Fig. 4 includes check valves for admitting air from outside and for preventing the escape thereof. The piston is formed with a port 31 and provided with a check valve 32 which opens inwardly. The valve stem 33 has a bearing 34 which is a part of the piston. A spring 35 compressed between a shoulder of the piston and a collar 36 on the valve stem normally closes the valve. The cylinder head 37 is provided with an outlet nipple 38 and with a valve seat 39. A check valve 40 is adapted to open outwardly and prevent the return of the compressed air. It is normally kept closed by a spring 41. The nipple 38 is formed for the attachment of a union 42 whereby an outlet pipe 43 is connected. The several pipes 43 are all connected to a collector pipe 44 which surrounds the frame member 14, these pipes being preferably made of metal and brazed so that they will be sufficiently supported by the cylinders. A pipe 45, preferably made of flexible material, conducts the compressed air from the collector pipe to the valve stem 20 of the tire, a suitable coupling 46 being provided for making connection with the valve stem.

When the compressor is attached to a rotating wheel every part thereof rotates with the wheel, with the exception of the weighted arm and crank. The resistance of the air being compressed in the cylinders causes the weighted arm to assume an angle to the perpendicular, which angle is determined partly by the location of the weight with reference to its fulcrum 26. As the arm moves away from the perpendicular its angular variation increases the leverage with which the force of gravity is applied to the pistons. The maximum pressure which may be developed may be varied by changing the adjustment of the weight on the arm, the series of holes 30 being provided for this purpose. The volume of air which is compressed is limited by the capacity of the ports 31 which admit it into the cylinders. Consequently, the weighted arm, if sufficiently weighted to compress the maximum volume, will not be thrown over its fulcrum by excessive speed of rotation of the wheel, because the volume of air admitted decreases as the excess of speed increases. Therefore the restriction of volume compensates for any restriction in the length of time of a compressing stroke.

The chief value of the compressor as means for inflating a tire upon a rotating wheel is that it can be used to furnish a continuous supply of air for a tire which is punctured, and thus enable the vehicle to proceed to a repair shop without "rim-cutting" the tire, or without incurring other inconveniences due to a deflated tire. If it is desired to inflate a tire while the vehicle is standing, the pistons may be operated by turning the arm 25 by means of the handle 50. The weight would better be removed when the arm is operated manually.

When the compressor is operated by the weight 28 and rotation of the wheel, it becomes inoperative automatically when the pressure in the tire reaches a predetermined degree. This degree is determined by the position of the weight on the arm. So long as the pressure is less than the predetermined degree the weight will hold the crank against turning, but when that degree is reached the force of the weight is overcome and the arm then turns with the wheel. Liability of bursting a tire by excessive inflation is thus avoided, and the vehicle is subjected to vibration, due to swinging of the weight, which is sufficient to indicate that the maximum pressure is reached.

Having thus explained the nature of my said invention and described a way of constructing and using the same, although without attempting to set forth all the forms in which it may be made or all the modes of its use, what I claim is:

1. An air compressor comprising a cylinder, means for affixing the same to a wheel, a piston for coöperating with said cylinder to compress air, a crank connected to said piston to reciprocate the same, means carried by the wheel for affording a bearing for said crank parallel to the wheel axis, said crank being weighted so as to remain substantially in one position while the cylinder rotates with the wheel, and an air conduit for connecting the cylinder with a pneumatic tire on said wheel.

2. An air compressor comprising a frame adapted to be affixed to a wheel, a cylinder affixed to said frame, a piston for coöperating with said cylinder to compress air, a crank connected to said piston to reciprocate the same, said crank having a bearing in said frame parallel to the wheel axis, said crank being weighted so as to be held against rotation when said frame rotates, and an air conduit for connecting the cylinder with a pneumatic tire on said wheel.

3. The combination with a wheel and pneumatic tire thereon, of a cylinder affixed to said wheel, a piston arranged to coöperate with said cylinder to compress air, a crank connected to said piston to reciprocate the same, means affixed to said wheel for affording a bearing for said crank parallel to the wheel axis, said crank being weighted so as to be held against rotation when its bearing support rotates with the wheel, and an air conduit for connecting said cylinder and tire.

In testimony whereof I have affixed my signature, in presence of two witnesses.

FREDERIK NIELSEN.

Witnesses:
THARWALD C. LILLEMAN,
P. W. PEZZETTI.